(12) United States Patent
Bakke

(10) Patent No.: US 8,256,587 B2
(45) Date of Patent: Sep. 4, 2012

(54) SHOCK ABSORBER

(75) Inventor: Harald Bakke, Gjøvik (NO)

(73) Assignee: EAB Engineering AS, Gjovik (NO)

( * ) Notice: Subject to any disclaimer, the term of this patent is extended or adjusted under 35 U.S.C. 154(b) by 312 days.

(21) Appl. No.: 12/669,371

(22) PCT Filed: Jul. 18, 2008

(86) PCT No.: PCT/NO2008/000272
§ 371 (c)(1),
(2), (4) Date: Jan. 15, 2010

(87) PCT Pub. No.: WO2009/011596
PCT Pub. Date: Jan. 22, 2009

(65) Prior Publication Data
US 2010/0187056 A1    Jul. 29, 2010

(30) Foreign Application Priority Data

Jul. 18, 2007  (NO) .................................. 20073712

(51) Int. Cl.
*F16F 9/48*      (2006.01)
*E21B 7/12*      (2006.01)

(52) U.S. Cl. ..... 188/287; 188/270; 188/281; 188/282.1; 188/282.5; 166/355

(58) Field of Classification Search .................. 188/270, 188/281, 282.1, 282.5; 166/350–360
See application file for complete search history.

(56) References Cited

U.S. PATENT DOCUMENTS

| | | | | |
|---|---|---|---|---|
| 2,367,977 A | * | 1/1945 | Thornhill | 267/64.15 |
| 3,362,742 A | * | 1/1968 | Sanderson | 293/134 |
| 3,446,317 A | * | 5/1969 | Gryglas | 188/287 |
| 3,664,463 A | * | 5/1972 | Kuethe | 188/377 |
| 3,750,856 A | * | 8/1973 | Kenworthy | 188/287 |
| 3,797,366 A | * | 3/1974 | Hanes et al. | 91/404 |
| 3,810,611 A | * | 5/1974 | Ito et al. | 267/64.16 |

(Continued)

FOREIGN PATENT DOCUMENTS

EP     1291548 A2    3/2003

(Continued)

OTHER PUBLICATIONS

International Search Report and the Written Opinion for PCT/NO2008/000272, mailed on Oct. 13, 2008.

*Primary Examiner* — Bradley King
*Assistant Examiner* — Mahbubur Rashid
(74) *Attorney, Agent, or Firm* — Myers Bigel Sibley & Sajovec

(57) ABSTRACT

A shock absorber for use in lowering a structure in a body of sea water. The shock absorber includes a cylinder with a piston arranged slidably therein, said piston having a piston rod which in use extends downwards out of the cylinder, wherein at least one chamber in the cylinder above the piston is fillable with a fluid and is provided with means for controlled exiting of the fluid from the chamber when the piston rod is subjected to an impact force which presses the piston inwards in the chamber. Said fluid is water deliverable from the body of sea water to said chamber through a valve device having a one-way function in the piston, and the piston and the piston rod alone have sufficient weight to pull the piston down and provide renewed filling of the chamber with water when the impact force has ceased.

10 Claims, 1 Drawing Sheet

U.S. PATENT DOCUMENTS

| | | | | |
|---|---|---|---|---|
| 3,844,544 A | * | 10/1974 | Keilholz | 267/64.22 |
| 3,889,934 A | * | 6/1975 | Kamman | 267/34 |
| 4,057,129 A | * | 11/1977 | Hennells | 188/285 |
| 4,636,113 A | | 1/1987 | Terai | |
| 5,566,794 A | * | 10/1996 | Wiard | 188/287 |
| 6,412,615 B1 | * | 7/2002 | Perez | 188/284 |

FOREIGN PATENT DOCUMENTS

| | | |
|---|---|---|
| FR | 2607842 | 10/1988 |
| GB | 590633 | 7/1947 |

\* cited by examiner

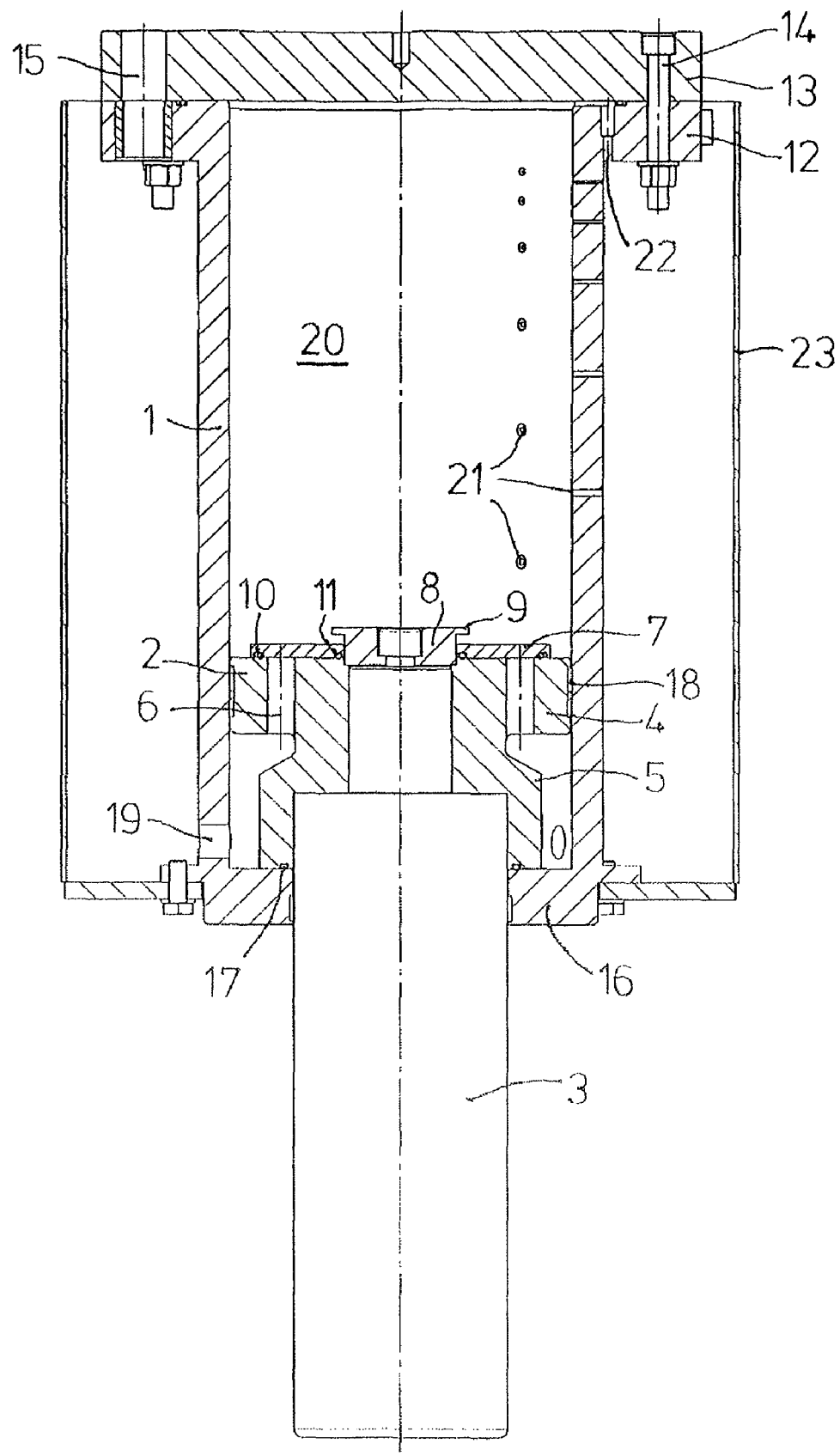

SHOCK ABSORBER

RELATED APPLICATIONS

The present application is a 35 U.S.C. §371 national phase application of PCT International Application No. PCT/NO2008/000272, filed Jul. 18. 2008, which claims priority from Norwegian Patent Application No. 20073712, filed Jul. 18, 2007, the disclosures of which are hereby incorporated herein by reference in their entireties. The above PCT International Application was published in the English language and has International Publication No. WO 2009/011596 A1.

In connection with underwater installations of heavier modules and tools in already installed structures there is often a need for damping systems in order to prevent large dynamic impact forces due to heave movement of the installation ship.

For intervention tools the requirement is normally that it must be damped from a landing speed of 1.8 m/sec to 0.1 m/sec, while for large structures which are installed with a good heave compensating system on the crane the requirement is typically that it must be damped from 0.5 m/sec to 0.1 m/sec.

A problem with existing damping cylinders, which generally are of the hydraulic type, is that it is difficult to make the piston return quickly enough out again in order to remain in contact with the substructure when the crane hook is subjected to a heave movement in the last phase of the lowering. This may give rise to several and possibly strong impacts before the structure comes to rest on the substructure.

The present invention aims at solving this problem and concurrently providing a shock absorber which is simple and may be produced at low cost, while having a quick and reliable function.

This is obtained according to the invention by a shock absorber as defined in claim 1.

Advantageous embodiments of the invention are defined in the dependent claims.

For better understanding of the invention it will be described more closely with reference to the exemplifying embodiment illustrated in the appended drawing, which shows an axial section through a shock absorber according to the invention.

The shock absorber shown in the drawing has a cylinder 1 and a piston 2 slidably arranged therein. The piston has a piston rod 3, which is solid and in the example shown has a diameter which is somewhat larger than half the diameter of the piston 2. The piston 2 with the piston rod 3 therefore has a relatively substantial weight.

The piston has an upper portion 4 having a full diameter and a lower portion 5 with reduced diameter. This permits a number of axial through-going holes 6 in the upper portion of the piston 6, said holes 6 having together a relatively large flow area. At the top the holes 6 are covered by a valve body 7, which is constituted by an annular disk which is axially movable within limits along a guide 8 having a stopper collar 9. The disk has O-rings 10 and 11 in order to seal against the piston 6 during an upward movement of the piston.

At the top the cylinder 1 is provided with a flange 12, and an upper cover 13 is attached to the flange 12 by means of bolts 14. The flange 12 and the cover 13 have also through-going holes 15 for the engagement of bolts (not shown) for temporary connection of the shock absorber according to the invention to the structure which is to be placed on the sea floor.

At the bottom the cylinder 1 has an inwardly turned collar 16 which forms a guide for the piston rod 3. The bottom side of the piston 2 is provided with an O-ring 17.

The upper portion 4 of the piston 2 is on its periphery provided with seals 18 which also provide low friction against the inner wall of the cylinder 1. It is within the general knowledge of the skilled person to find suitable materials for this function.

At the bottom the cylinder 1 is provided with a number of inlet openings 19 which are in flow connection with the through-going holes 6 in the piston 2. The chamber 20 formed inside the cylinder above the piston 2 in the lower position thereof and the upper cover 13 is provided with a plurality of exit openings 21, shown here in two axially extending rows. The openings 21 have diminishing diameter in the upwards direction, so that when the piston moves past the openings, the flow area of the remaining openings will be reduced in an approximately exponential way towards an asymptotic value determined by the opening 22 through the flange 12, which always will remain open.

The exemplifying embodiment of the invention shown is also provided with a removable casing 23, also called a bucket, which is only used to fill the shock absorber and form a water reservoir for testing the shock absorber on dry land. The casing 23 is therefore removed before the shock absorber is lowered into the sea mounted on the structure to be damped during placement on the sea floor.

During this lowering, the piston 2 with the piston rod 3 will assume the position shown in the figure. Sea water will flow into the cylinder chamber 20 through the openings 19 and the piston shelf 6 past the valve body 7 and partly also through the exit openings 21 and 22. Initially, there will be an air pocket at the top of the chamber 20, but the pocket will be strongly compressed during the lowering of the shock absorber and will not have any appreciable effect on the function of the shock absorber.

When the structure suspended in a heave compensated crane on a surface vessel has come sufficiently close to its landing spot, the piston rod 3 will impact against its intended substructure and force the piston 2 upwards in the cylinder chamber 20. The valve body 7 will keep the piston closed, forcing the water on the top side thereof to exit through the exit openings or nozzles 21 and 22, thus providing the piston with the desired piston force. As the piston moves into the chamber 20 and passes the holes 21 in succession, the available flow area through the nozzles is reduced, so that the flow resistance would increase if the penetrating velocity of the piston 2 were constant. However, the penetration velocity will decrease due to the slowing of the structure, so that by suitable sizing of the nozzles 21 the penetration force will stay substantially constant during the entire penetration.

If the structure should be subjected to a heave movement before it has arrived at its final destination, the cylinder 1 of the shock absorber will move upwards together with the structure. However, the piston rod will stay in contact with the substructure because the inlet openings 19 and holes or channels 6 in the piston 2 have a sufficiently large flow area for the volume in the chamber 20 above the piston to be refilled so quickly that a sufficiently large lifting force on the piston for the piston rod to move up from the substructure will not occur. It will be understood that only a small force will be necessary to lift the valve body 7, so that the valve body will not create any noticeable flow resistance either.

If the heave movement should be so large that the stroke of the piston is exceeded, the piston will have reached its lower position as shown in the figure and be ready to perform its impact dampening function once more when the structure moves downwards again.

It will be understood that the invention is not limited to the exemplifying embodiment described above, but may be modified and varied by the skilled person within the scope of the following claims. It will also be understood that the shock absorber according to the invention may not be used for large structures only, but that it may advantageously be used for smaller objects like tools and the like. One envisions the shock absorber made with different internal diameters varying between 80 mm and 250 mm, for instance in steps of 20-50 mm, in order to cover possible areas of use.

The invention claimed is:

1. A shock absorber for use in lowering a structure in a body of sea water to the bottom thereof, the shock absorber being completely submerged in the body of sea water during said lowering of the structure, the shock absorber comprising:
    a cylinder with a piston arranged slidably therein, said piston having a piston rod which in the use of the shock absorber extends downwards out of the cylinder, wherein at least one chamber in the cylinder above the piston is finable with a fluid and is provided with means for controlled exiting of the fluid from the chamber to the body of sea water when the piston rod is subjected to an impact force which presses the piston inwards in the chamber,
    wherein said fluid is water deliverable from the body of sea water to said chamber through a valve device having a one-way function in the piston, and
    wherein the piston and the piston rod alone have sufficient weight to pull the piston down and provide renewed filling of the chamber with water primarily through the valve device when the impact force has ceased and before a new pressing in of the piston rod is caused by heave movement of the structure.

2. A shock absorber according to claim 1, wherein said means for controlled exiting of the fluid comprises a plurality of discharge openings in the chamber which are in succession made inactive by the piston moving inwards in the chamber.

3. A shock absorber according to claim 2, wherein the flow area and positioning of the discharge openings are arranged so that the remaining total flow area decreases approximately exponentially as the piston is moving inwards into the chamber.

4. A shock absorber according to claim 3, wherein the exponential reduction occurs asymptotically towards an end value.

5. A shock absorber according to claim 1, wherein the cylinder is provided with openings configured to permit the surrounding body of sea water to be used as said fluid.

6. A shock absorber according to claim 1, wherein the cylinder is surrounded by an upwardly open casing which permits filling of the cylinder with fluid to test the shock absorber before said structure is lowered into said body of sea water.

7. A shock absorber according to claim 1, wherein the shock absorber is provided with means for temporarily connecting the shock absorber to said structure.

8. A shock absorber according to claim 1, wherein said valve device comprises a plurality of axial channels through the piston, wherein said channels are closable on the top side of the piston by means of a valve body having a limited movement.

9. A shock absorber according to claim 8, wherein the valve body is an annular disk which is movable by means of differential pressure and its own weight.

10. A shock absorber according to claim 1, wherein the piston rod is solid and has a diameter which exceeds half the diameter of the piston.

* * * * *